United States Patent
Wu et al.

(10) Patent No.: US 7,239,536 B2
(45) Date of Patent: Jul. 3, 2007

(54) ELECTRONIC APPARATUS AND DC POWER INPUT APPARATUS THEREOF

(75) Inventors: Yung-Lu Wu, Taipei (TW); Wen-Chun Shen, Taipei (TW); Jung-Hua Chung, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/269,630

(22) Filed: Nov. 9, 2005

(65) Prior Publication Data

US 2006/0268591 A1    Nov. 30, 2006

(30) Foreign Application Priority Data

May 31, 2005   (TW)   ................... 94117880 A

(51) Int. Cl.
*H02M 1/00*    (2006.01)
(52) U.S. Cl. .................................................. 363/146
(58) Field of Classification Search ............... 363/146, 363/145, 147
See application file for complete search history.

(56) References Cited

U.S. PATENT DOCUMENTS 5,777,868 A * 7/1998 Gibboney, Jr. ............... 363/146
6,937,490 B2 * 8/2005 MacDonald et al. ........ 363/142

* cited by examiner

*Primary Examiner*—Adolf Berhane
(74) *Attorney, Agent, or Firm*—Rabin & Berdo PC

(57) ABSTRACT

An electronic apparatus, for inputting a DC power through an adapter, includes a loading circuit and a DC power input apparatus. The loading circuit, including a first power input terminal and a second power input terminal, is used for receiving the first DC power. The DC power input apparatus, for inputting the first DC power to the loading circuit, includes a fuse and rectifier. The fuse includes a first terminal coupled to a first voltage terminal of the adapter, and a second terminal coupled to the first voltage input terminal of the loading circuit. The rectifier, coupled to the fuse, includes a first polarity terminal coupled to the second terminal of the fuse, and a second polarity terminal coupled to a second voltage terminal of the adapter and the second power input terminal of the loading circuit. The second polarity terminal has a polarity inverse to the second voltage terminal.

2 Claims, 2 Drawing Sheets

ELECTRONIC APPARATUS AND DC POWER INPUT APPARATUS THEREOF

This application claims the benefit of Taiwan application Serial No. 94117880, filed May 31, 2005, the subject matter of which is incorporated herein by reference.

BACKGROUND OF THE INVENTION

1. Field of the Invention

The invention relates in general to an electronic apparatus and protection apparatus thereof, and more particularly to an electronic apparatus, which uses a fuse to prevent a reverse current from inputting to a loading circuit therein via an adapter, and DC power input apparatus thereof.

2. Description of the Related Art

FIG. 1 is a block diagram of a conventional notebook computer structure. Referring to FIG. 1, the notebook computer 100 includes a loading circuit 110, a DC power input circuit 120, and a battery power device 130. The DC power input circuit 120 has a first switch 122, while the battery power device 130 has a second switch 132 and a battery 134. By switching the first switch 122 and the second switch 132, the notebook computer 100 can selectively use the DC power input circuit 120 to input a DC power DC1 to the loading circuit 110 via an adapter 140, or use the battery 134 to input a DC power DC2 to the loading circuit 110.

Owing that the first switch 122 and the second switch 132 usually have parasitic diodes 123 and 133 respectively, when a reverse voltage is inputted to the notebook computer 100 due to inverse-polarity connection of the adapter 140 or interior device damage, the induced reverse current Ir will still damage the loading circuit 110 or the battery 134 via the parasitic diode 123 or 133 even though the first switch 122 or the second switch 132 is turned off.

In order to prevent the reverse voltage from damaging the loading circuit 110 or the battery 134, a rectifier 124, such as a set of diodes 126 connected in parallel, is usually configured in the adapter 120 as a protection circuit. Through rectification effect of the rectifier 124, the above-mentioned reverse current Ir cannot flow by the diodes 126, thereby achieving the purpose of protecting the loading circuit 110 or the battery 134.

However, along with the increase of power used by the notebook computer 100, the bias current If inputted from the adapter 140 is getting larger and larger. Therefore, in order to effectively protect the loading circuit 110 or the battery 134, the above-mentioned rectifier 124 must have features of large bias current, low power consumption, and small reverse leakage current, which increases number of the diodes 126, thus magnify the space occupied by the rectifier 124, and largely increases the cost for manufacturing the notebook computer 100.

SUMMARY OF THE INVENTION

It is therefore an object of the invention to provide an electronic apparatus and DC power input apparatus thereof. A fuse is disposed in the DC power input apparatus as a protection circuit. When a large reverse current is inputted from the adapter, the fuse is broken off by the reverse current to achieve the purpose of protecting the loading circuit in the electronic apparatus and reduce the cost for designing a protection circuit.

The invention achieves the above-identified object by providing a DC power input apparatus disposed in an electronic apparatus for inputting a DC power to the loading circuit of the electronic apparatus. The DC power input apparatus includes a fuse and a rectifier. The fuse includes a first terminal and a second terminal. The first terminal is for coupling to a first voltage terminal of the adapter and the second terminal is for coupling to a first power input terminal of the loading circuit. The rectifier, coupled to the fuse, includes a first polarity terminal and a second polarity terminal. The first polarity terminal is for coupling to the second terminal of the fuse and the second polarity terminal is for coupling to a second voltage terminal of the adapter and a second power input terminal of the loading circuit. The second polarity terminal of the rectifier has a polarity inverse to the second voltage terminal of the adapter.

The invention achieves the above-identified object by providing an electronic apparatus for inputting a first DC power through an adapter. The electronic apparatus includes a loading circuit and a DC power input apparatus. The loading circuit, including a first power input terminal and a second power input terminal, is used for receiving the first DC power. The DC power input apparatus, for inputting the first DC power to the loading circuit, includes a fuse and a rectifier. The fuse includes a first terminal coupled to a first voltage terminal of the adapter, and a second terminal coupled to the first voltage input terminal of the loading circuit. The rectifier, coupled to the fuse, includes a first polarity terminal coupled to the second terminal of the fuse, and a second polarity terminal coupled to a second voltage terminal of the adapter and the second power input terminal of the loading circuit. The second polarity terminal of the rectifier has a polarity inverse to the second voltage terminal of the adapter.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
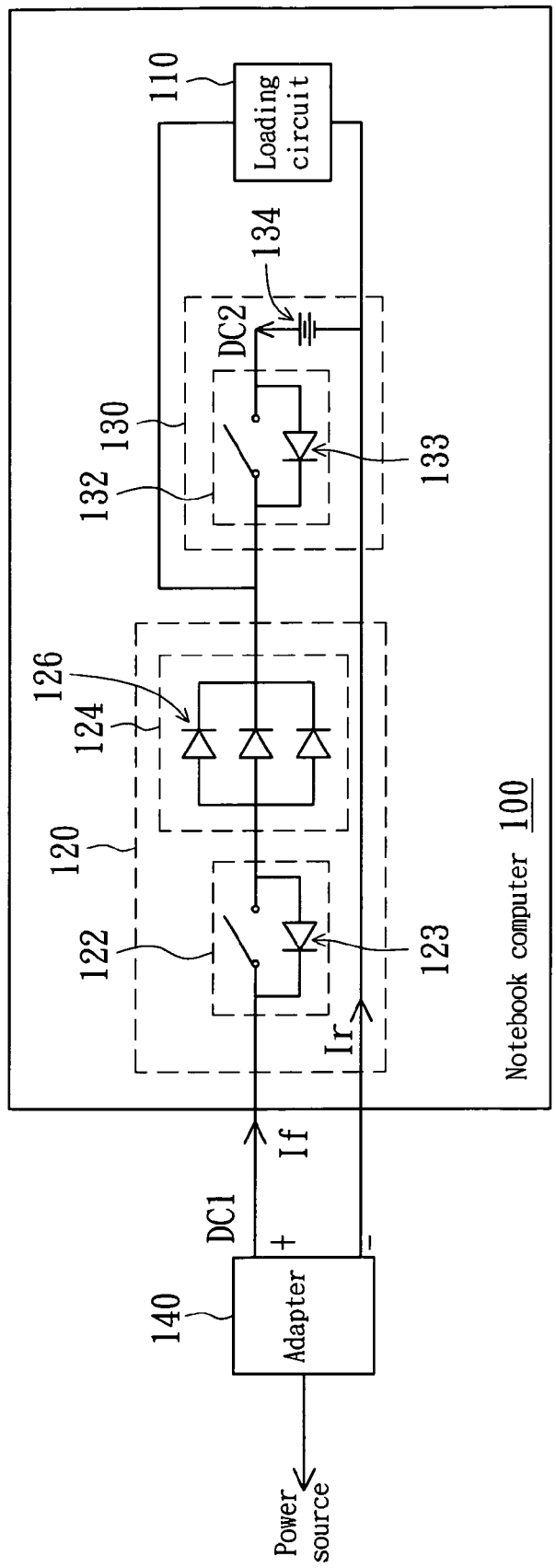
FIG. 1 is a block diagram of a conventional notebook computer structure.
Figure 2:
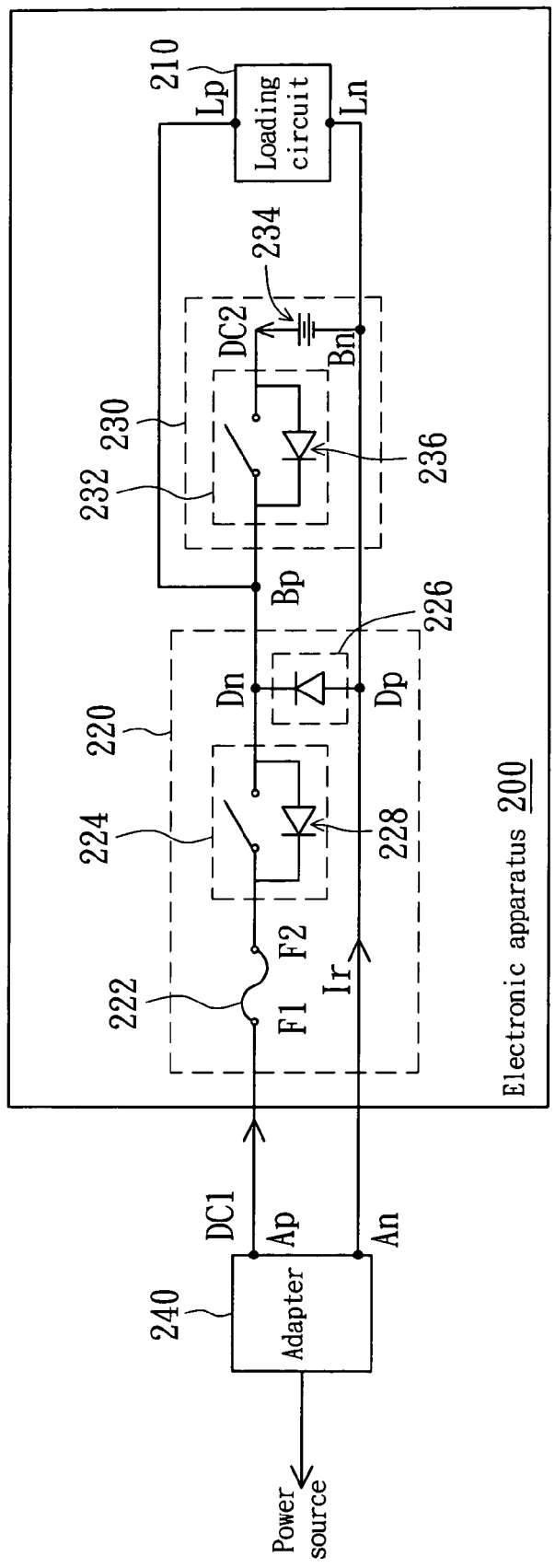
FIG. 2 is a block diagram of an electronic apparatus structure according to a preferred embodiment of the invention.

Referring to FIG. 2, a block diagram of an electronic apparatus structure according to a preferred embodiment of the invention is shown. The electronic apparatus 200, such as a notebook computer, includes a loading circuit 210, a DC power input apparatus 220, and a battery power device 230. The DC power input apparatus 220 includes a fuse 222, a first switch 224, and a rectifier 226. The battery power device 230 includes a second switch 232 and a battery 234. The DC power input apparatus 220 is for inputting a DC power DC1 to the loading circuit 210 via an adapter 240. Furthermore, the electronic apparatus 200 can selectively use the DC power input apparatus 220 to input a DC power DC1 or use the battery 234 to input a DC power DC2 to the loading circuit 210 by switching the first switch 224 and the second switch 232.

The fuse 222 has a first terminal F1 and a second terminal F2. The first terminal F1 is coupled to the positive terminal Ap of the adapter 240. The rectifier 226, such as a diode, has a positive terminal Dp and a negative terminal Dn. The negative terminal Dn is coupled to the positive power input terminal Lp of the loading circuit 210 while the negative terminal Dp is coupled to the negative power input terminal An of the adapter 240 and the negative power input terminal Ln of the loading circuit 210. The first switch 224 is coupled between the second terminal F2 of the fuse 222 and the negative terminal Dn of the rectifier 226. The battery power device 230 has a positive terminal Bp coupled to the positive power input terminal Lp of the loading circuit 210 and a negative terminal Bn coupled to the negative power input terminal Ln of the loading circuit 210.

It is noted that the positive terminal Dp of the rectifier 226 has a polarity inverse to the negative terminal An of the adapter 240. When the first switch 224 of the electronic apparatus 200 is turned on to input the DC power DC1 to the loading circuit 210, the second switch 232 is turned off. At the time, if a reverse voltage is inputted to the electronic apparatus 200 due to inverse-polarity connection of the adapter 240 or interior circuit damage, the induced reverse current Ir can be guided directly by the rectifier 226, acting like a guiding channel, to flow by the first switch 224 and break off the fuse 222. The period when the reverse current Ir is inputted until the fuse is broken off is usually only a few mini-seconds, so the reverse current Ir will not damage the loading circuit 210 and flow by the parasitic diode 236 of the second switch 232 to damage the battery 234.

Similarly, when the second switch 232 of the electronic apparatus 200 is turned on to supply the DC power DC2 to the loading circuit 210, the first switch is turned off. The above-mentioned reverse current Ir inputted from the adapter 240 can flow the parasitic diode 228 of the first switch 224 via the rectifier 226, and break off the fuse 222. Therefore, in the duration of only a few mini-seconds, the reverse current Ir will not damage the loading circuit 210 and flow by the second switch 232 to damage the battery 234, thereby achieving the purpose of protecting the loading circuit 210 and the battery 234.

As described above, although the electronic apparatus 200 which can selectively use the adapter 240 or interior battery 234 to supply power is taken as an example in the invention, the electronic apparatus 200 of the invention can supply only the DC power inputted from the adapter 240, the rectifier 226 has not the first switch 224, and the rectifier 226 can be directly coupled to the fuse 222. When the reverse current is input from the adapter 240, the reverse current can be still be guided by the rectifier 226 to break off the fuse 222 to achieve the purpose of protecting the loading circuit 210. Therefore, it will not be apart from the scope of the invention.

Besides, the fuse 222 in the above-mentioned DC power input apparatus is coupled to the positive terminal Ap of the adapter 240, and the first switch 224 is coupled between the fuse 222 and the rectifier 226. However, in the DC power input apparatus 220 of the invention, the fuse 222 can also be coupled between the negative terminal Ap of the adapter 240 and the positive terminal Dp of the rectifier 226, or the negative terminal Dn of the rectifier 226 can also be coupled between the fuse 222 and the first switch 224. In these cases, the reverse current inputted from the adapter 240 can be guided by the rectifier 226 to break off the fuse 222 and thus the purpose of protecting the loading circuit 210 or the battery 234 can be achieved.

The electronic apparatus and DC power input apparatus disclosed by the above-mentioned embodiment of the invention has the following advantages. Simple protection circuit design of a fuse and a rectifier used in the DC power input apparatus can effectively prevent a reverse voltage inputted from the adapter from damaging the loading circuit or the battery power device. Therefore, both the space occupied by the protection circuit and the cost for designing the protection circuit can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus, for receiving a first DC power through an adapter or receiving a second DC power from a battery, the electronic apparatus comprising:
    a circuit, comprising a first power input terminal and a second power input terminal, for receiving the first DC power or the second DC power;
    a first switch, having a first parasitic diode, the first switch being coupled to the first power input terminal;
    a second switch, being coupled to the first power input terminal, the second switch coupling the second DC power to the circuit selectively;
    a fuse, comprising:
        a first terminal, being coupled to a first voltage terminal of the adapter; and
        a second terminal, being coupled to the first power input terminal of the circuit through the first switch; and
    a rectifier, coupled to the fuse, the rectifier comprising:
        a first polarity terminal, being coupled to the second terminal of the fuse through the first switch; and
        a second polarity terminal, being coupled to a second voltage terminal of the adapter and the second power input terminal of the circuit, wherein the second polarity terminal has a polarity inverse to the second voltage terminals,
    wherein when the first switch is turned on, the first DC power is inputted to the circuit, and when the second switch is turned on, the second DC power is inputted to the circuit;
    wherein when a reverse voltage is inputted from the adapter to the electronic apparatus, a reverse current corresponding to the reverse voltage flows from the rectifier to the fuse through the first switch if the first switch is turned on, or through the first parasitic diode if the first switch is turned off.

2. The electronic apparatus according to claim 1, wherein the rectifier is a diode having a positive terminal and a negative terminal, the positive terminal acts as the second polarity terminal and the negative terminal acts as the first polarity terminal, the second voltage terminal is negative terminal.

* * * * *